US012608314B2

(12) United States Patent
Walker

(10) Patent No.: US 12,608,314 B2
(45) Date of Patent: Apr. 21, 2026

(54) BANK MAPPING FOR MEMORY

(71) Applicant: Micron Technology, Inc., Boise, ID (US)

(72) Inventor: Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/777,466

(22) Filed: Jul. 18, 2024

(65) Prior Publication Data

US 2025/0053512 A1     Feb. 13, 2025

Related U.S. Application Data

(60) Provisional application No. 63/531,190, filed on Aug. 7, 2023.

(51) Int. Cl.
G06F 12/06          (2006.01)

(52) U.S. Cl.
CPC .... G06F 12/063 (2013.01); G06F 2212/7201 (2013.01)

(58) Field of Classification Search
CPC ........... G06F 12/063; G06F 2212/7201; G06F 12/0292; G06F 2212/1048; G06F 2212/7208; G06F 12/0284; G06F 12/0238

USPC ......................................................... 711/154
See application file for complete search history.

(56) References Cited

U.S. PATENT DOCUMENTS

| | | | | |
|---|---|---|---|---|
| 6,070,227 A * | 5/2000 | Rokicki | .............. | G06F 12/0882 711/111 |
| 6,108,745 A | 8/2000 | Gupta et al. | | |
| 7,797,481 B2 | 9/2010 | Lee et al. | | |
| 2014/0108889 A1* | 4/2014 | Shaeffer | ................... | G11C 7/10 714/768 |
| 2021/0133100 A1* | 5/2021 | Artieri | ................ | G06F 12/0607 |

* cited by examiner

*Primary Examiner* — Hua J Song

(74) *Attorney, Agent, or Firm* — Brooks, Cameron & Huebsch, PLLC

(57)                    ABSTRACT

Mapping addresses to banks can include receiving a plurality of row bits, a plurality of column bits, and a plurality of bank bits and generating a rank bit from a bank bit from the plurality of bank bits. Updated bank bits can be generated by removing the bank bit from the plurality of bank bits. The plurality of row bits, the plurality of column bits, the rank bit, and the updated bank bits can be provided to the controller to access a plurality of banks of the memory device.

19 Claims, 4 Drawing Sheets

100

110

115

MEMORY SUB-SYSTEM

MEMORY
SUB-SYSTEM
CONTROLLER

120

PROCESSOR ~117

130

HOST
SYSTEM

LOCAL MEMORY ~119

MEMORY
DEVICE

LOCAL MEDIA
CONTROLLER

· · ·

135

MAPPING
CIRCUITRY ~113

REGISTERS ~114

MEMORY
DEVICE ~140

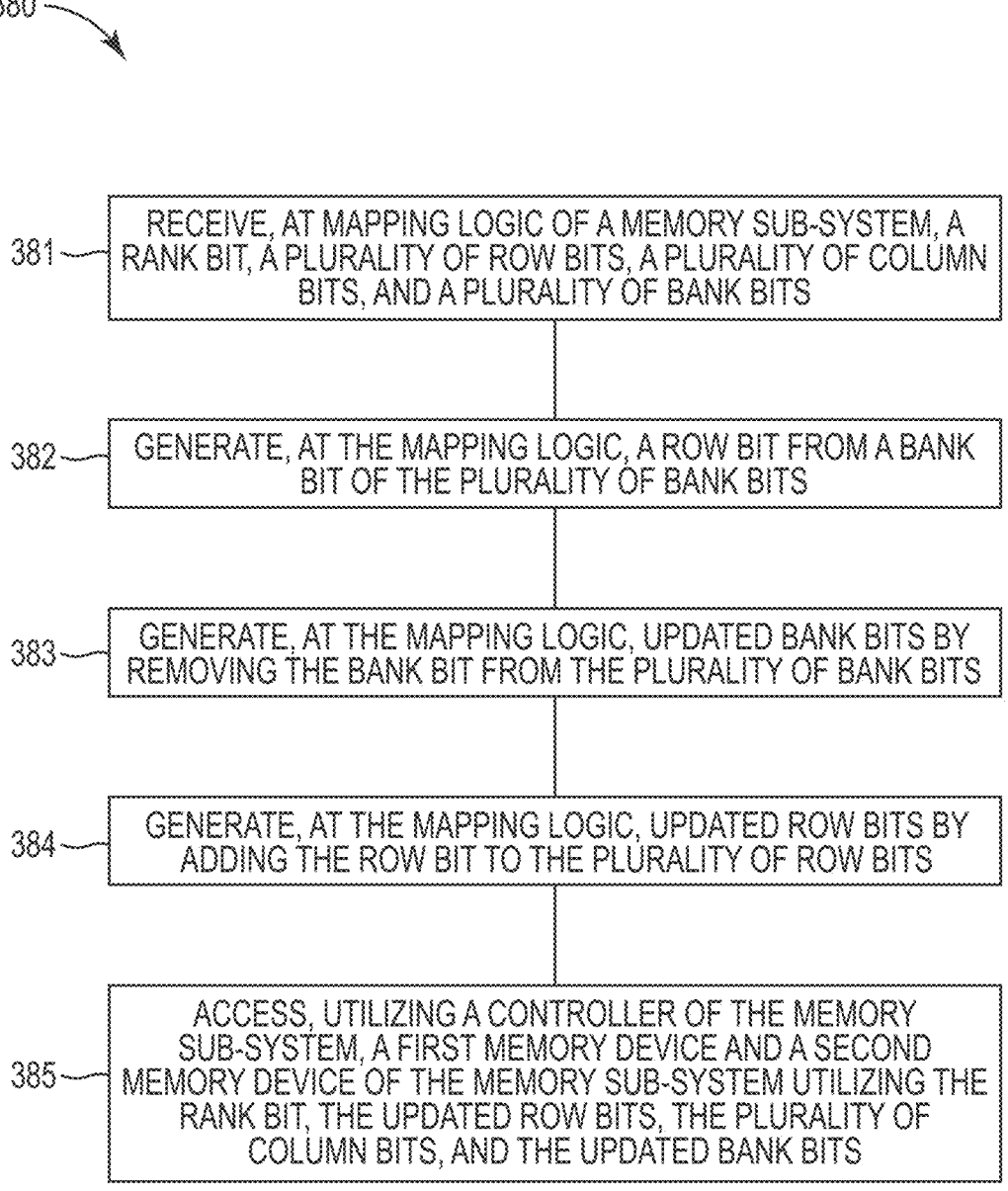

380

381 — RECEIVE, AT MAPPING LOGIC OF A MEMORY SUB-SYSTEM, A RANK BIT, A PLURALITY OF ROW BITS, A PLURALITY OF COLUMN BITS, AND A PLURALITY OF BANK BITS

382 — GENERATE, AT THE MAPPING LOGIC, A ROW BIT FROM A BANK BIT OF THE PLURALITY OF BANK BITS

383 — GENERATE, AT THE MAPPING LOGIC, UPDATED BANK BITS BY REMOVING THE BANK BIT FROM THE PLURALITY OF BANK BITS

384 — GENERATE, AT THE MAPPING LOGIC, UPDATED ROW BITS BY ADDING THE ROW BIT TO THE PLURALITY OF ROW BITS

385 — ACCESS, UTILIZING A CONTROLLER OF THE MEMORY SUB-SYSTEM, A FIRST MEMORY DEVICE AND A SECOND MEMORY DEVICE OF THE MEMORY SUB-SYSTEM UTILIZING THE RANK BIT, THE UPDATED ROW BITS, THE PLURALITY OF COLUMN BITS, AND THE UPDATED BANK BITS

FIG. 3

BANK MAPPING FOR MEMORY

PRIORITY INFORMATION

This application claims the benefit of U.S. Provisional Application No. 63/531,190 filed on Aug. 7, 2023, the contents of which are incorporated herein by reference.

TECHNICAL FIELD

Embodiments of the disclosure relate generally to memory sub-systems, and more specifically, relate to mapping banks for memory.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 3 is a flow diagram corresponding to a method for mapping banks in accordance with some embodiments of the present disclosure.

DETAILED DESCRIPTION

Figure 1:
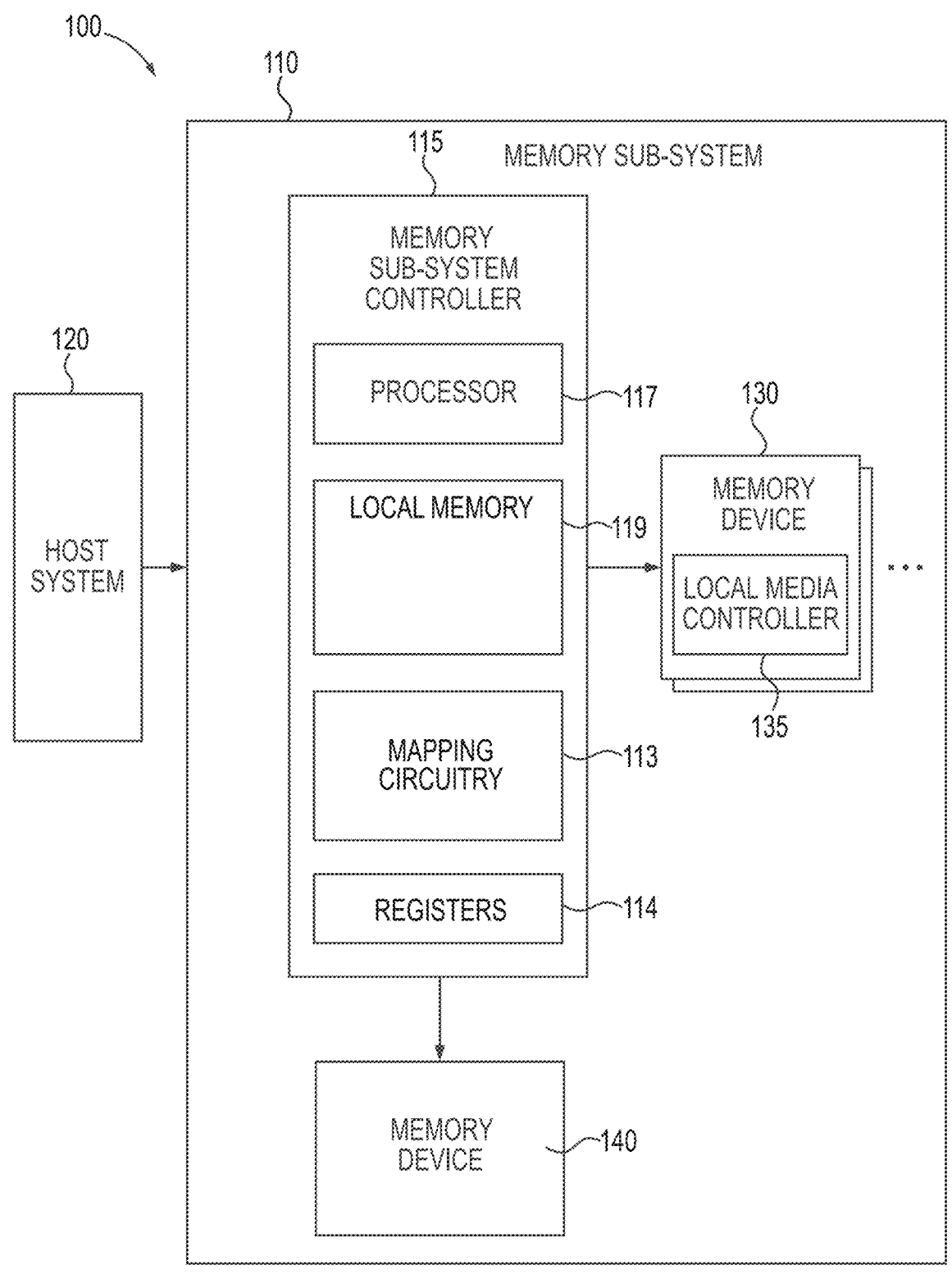
FIG. 1 illustrates an example computing system that includes mapping circuitry in accordance with some embodiments of the present disclosure.

Aspects of the present disclosure are directed to mapping banks, in particular to memory sub-systems that includes mapping circuitry for mapping banks. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

Emerging memory (e.g., three-dimensional cross-point ("3D cross-point") memory) typically has a slower page cycle time as compared to dynamic random access memory (DRAM) and/or ferroelectric random access memory (FeRAM). A page cycle time is a time spanning the opening of a page, the closing of the page, and the opening of a next page. More banks can be implemented in memory to achieve a performance (bandwidth) threshold in view of the slow page cycle time. Controllers however get more complex and larger when managing higher bank counts.

A high bank count device having a single or low number of ranks can be implemented as compared to two or a higher number of ranks in a memory sub-system to overcome the slow page cycle time. As used herein, a rank is a number of memory devices coupled to a same chip select. When one rank is available, a single device can be implemented with a quantity of banks to perform well. As the number of ranks implemented in a device increase, the number of banks decrease to avoid making the controller too complex or too costly. Increasing the banks in a device having a single or low number of ranks can also increase the complexity and cost of the controller.

If performance is poor with one rank, then any solution at that density would not be desirable. For some FeRAM devices, a single rank with 32 banks architecture loses roughly 25% bandwidth as compared to a single rank with 64 banks architecture. However, utilizing two ranks with 128 banks architecture would cause the controller of the memory sub-system to be too complex and/or expensive making the two ranks with 128 banks architecture unpractical.

A tradeoff is made in selecting a max number of banks of a memory sub-system. The max number of banks can correspond to the largest density supported by a memory sub-system. In view of the max number of banks, as the density decreased (e.g., fewer ranks) the performance of the memory sub-system drops off. Double Data Rate 5 (DDR5) Synchronous Dynamic Random-Access Memory (SDRAM) is an example of memory that loses performance as the density decreases. Two ranks may be utilized to achieve its optimal performance.

The memory sub-system can be optimized (bandwidth) for single rank performance as opposed to the optimized performance point being that of two-rank or N number of ranks, where N is the optimal operating point of the memory sub-system. For example, given a memory sub-system with a long page cycle time that utilizes 64 banks to achieve a threshold level of performance, the memory sub-system can manage 64 banks in total. In previous approaches 32 banks would be utilized per rank if the goal was to have a two rank (max) system. The single rank system would have poor performance because the single rank would also utilize 32 banks.

Aspects of the present disclosure address the above and other deficiencies by implementing mapping circuitry to create a mapping that would allow the quantity of banks to increase while retaining the size and/or complexity of a controller. A memory sub-system can be optimized for a single rank by grouping banks together to appear, to the controller, as a single bank. The number of banks grouped depends on the ratio of banks in the device compared to the number of banks that the memory controller can support. The memory controller can group banks by mapping bank bits of the addresses the memory controller receives to the rank bit of the device. Bits of an address can be multiplexed to provide a mapping that groups banks. The multiplexor (MUX) can be controlled by configuration registers of the controller. In a one rank architecture the MUX would remap the bank bit to a rank bit of the device to treat the grouping of banks as another rank. The controller can also set the rank-to-rank delay, the spacing needed between successive reads when switching ranks, to zero. Given that there is a single rank, no gaps between reads are utilized to prevent collisions on the data bus. To the memory controller, a memory device having a single rank looks to be half the density when the bank bit is mapped to the rank bit because the memory device appears to have two ranks without any rank-to-rank switching penalty. Thus, improved performance for single rank architectures is possible without bloating the number of banks when using true multi-rank configurations.

FIG. 1 illustrates an example computing system 100 that includes mapping circuitry in accordance 113 with some embodiments of the present disclosure. The memory sub-system 110 can include media, such as one or more volatile memory devices (e.g., memory device 140), one or more non-volatile memory devices (e.g., memory devices 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory devices 130) include negative-and (NAND) type flash memory and write-in-place memory, such as a 3D cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, includes single level cells (SLC) which can store one bit per cell. Other types of memory cells, such as multi-level cells (MLCs), triple level cells (TLCs), quad-level cells (QLCs), and penta-level cells (PLC), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory devices 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130 and/or the memory device 140.

In some embodiments, the memory devices 130 includes local media controllers 135 that operate in conjunction with memory sub-system controller 115 to execute operations on one or more memory cells of the memory devices 130. An external controller (e.g., memory sub-system controller 115) can externally manage the memory devices 130 (e.g., perform media management operations on the memory devices 130). In some embodiments, the memory devices 130 are managed memory devices, which is a raw memory device combined with a local controller (e.g., local controller 135) for media management within the same memory device package. An example of a managed memory device is a managed NAND (MNAND) device.

The memory sub-system 110 can include mapping circuitry 113. Although not shown in FIG. 1 so as to not obfuscate the drawings, the mapping circuitry 113 can include various circuitry to map an address received from a host to an address that can be utilized to access the memory devices 130, 140. In some embodiments, the mapping circuitry 113 can include special purpose circuitry in the form of an ASIC, FPGA, state machine, and/or other logic circuitry that can allow the mapping circuitry 113 to orchestrate and/or perform operations to decode an address and map the address of the memory devices 130, 140.

In some embodiments, the memory sub-system controller 115 includes at least a portion of the mapping circuitry 113. For example, the memory sub-system controller 115 can include a processor 117 (processing device) configured to execute instructions stored in local memory 119 for performing the operations described herein. In some embodiments, the mapping circuitry 113 is part of the host system 110, an application, or an operating system.

In a non-limiting example, an apparatus (e.g., the computing system 100) can include a memory sub-system mapping circuitry 113. The mapping circuitry 113 can be resident on the memory sub-system 110. As used herein, the term "resident on" refers to something that is physically located on a particular component. For example, the mapping circuitry 113 being "resident on" the memory sub-system 110 refers to a condition in which the hardware circuitry that includes the mapping circuitry 113 is physically located on the memory sub-system 110. The term "resident on" can be used interchangeably with other terms such as "deployed on" or "located on," herein. Although the mapping circuitry 113 is shown as being within the controller 115, the mapping circuitry 113 can also be external to the controller 115. Two instances of the mapping circuitry 113 are shown in FIG. 1. The mapping circuitry 113 can be implemented entirely within the controller 115, without the controller 115, or a combination of without and within the controller 115.

The mapping circuitry 113 can receive a plurality of signals representing bits. The plurality of signals can be received from a plurality of pins of the memory sub-system 110. The pins of the memory sub-system 110 can be utilized to form a physical connection between the memory sub-system 110 and the host 120. The bits received from the host 120 can be an address corresponding to an access command also received from the host 120. The access command can be a read command or write command, among others. In various instances, the address received from the host 120 can be provided in relation to a logical command and/or to be utilized with a network executed by an accelerator such as an artificial neural network. The logical command can be executed by the processor 117 and/or utilizing sensing circuitry of the memory devices 130, 140.

In various instances, the bits received by the mapping circuitry 113 can decoded and mapped to access the memory devices 130, 140. The addresses corresponding to the access command may be decoded and mapped to allow the controller 115, that is optimized to control a first quantity of banks, to access a second quantity of banks of the memory devices 130, 140 where the first quantity banks is smaller than the second quantity of banks.

Figure 2:
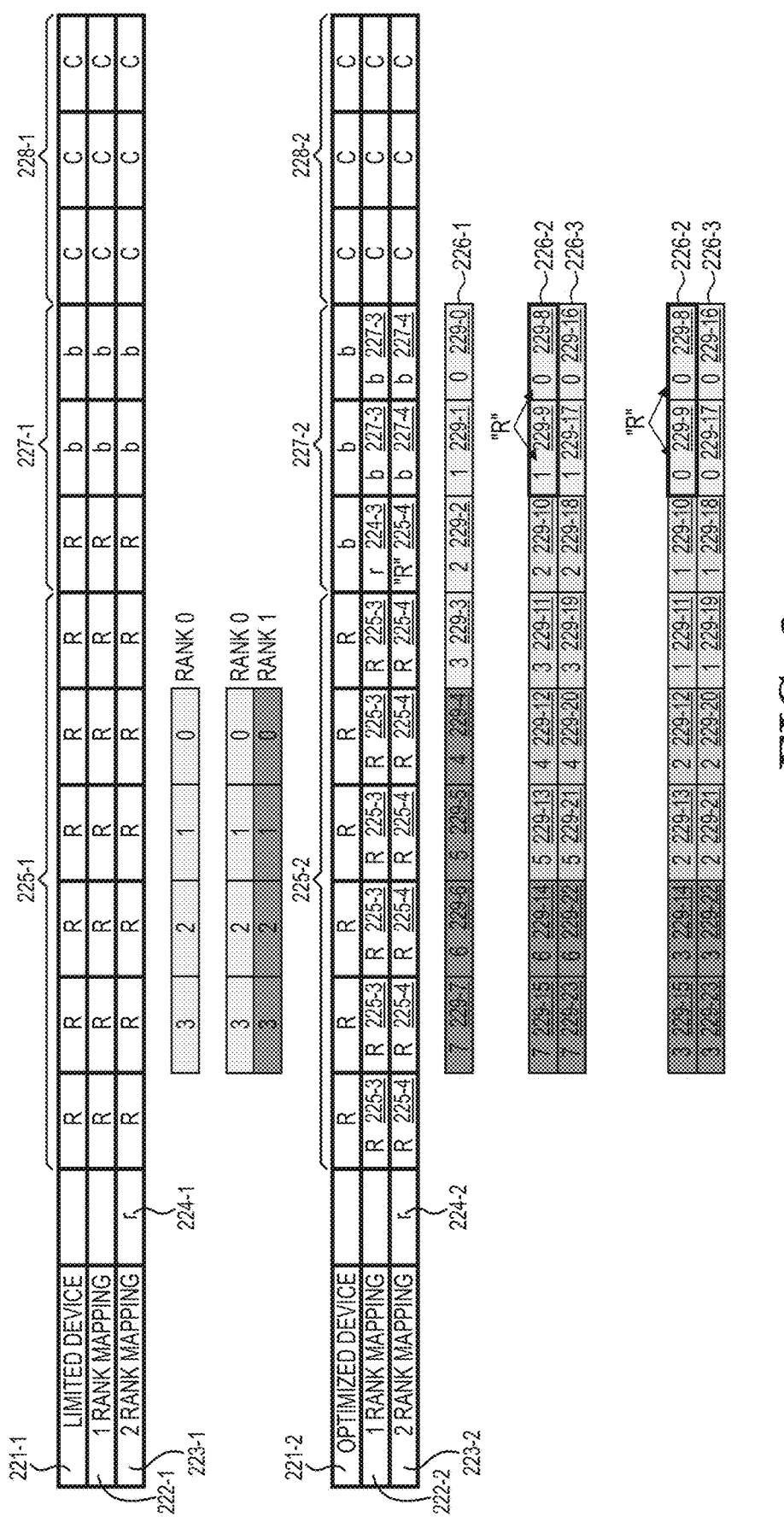
FIG. 2 illustrates rank mappings in accordance with some embodiments of the present disclosure.

The examples provided herein are in the context of 4, 8, and/or 16 banks. However, the examples can be applied to 32, 64, 128, and/or more banks. The memory devices 130 can have 8 or 16 banks while the controller 115 is configured to access 4 or 8 banks. The mapping performed utilizing the bits of the address received from the host 120 can allow the controller 115 to generate addresses for 4 or 8 banks when the memory devices 130 are implemented utilizing 8 or 16 banks. The memory devices 130 are shown as having one or more memory devices 130. Each of the memory devices 130 can be a rank of banks. For example, a first memory device can be a first rank of 8 banks and the second memory device can be a second rank of 8 banks. Mapping the bits of the addresses can allow the controller 115 to be configured for a smaller number of banks than the quantity of banks the memory devices 130 are implemented with. Allowing a controller 115 that is configured with a smaller number of banks to function utilizing a larger number of banks can allow the controller 115 to overcome the slow page cycle time while maintaining a size and/or cost of the controller 115. FIG. 2 shows mappings utilized to allow a controller configured for a first quantity of banks to function utilizing a second quantity of banks.

FIG. 2 illustrates rank mappings 222-1, 222-2, 223-1, 223-2 in accordance with some embodiments of the present disclosure. FIG. 2 shows a configuration 221-1 for a limited device and a configuration 221-2 for an optimized device. The device may be "limited" (e.g., limited device) or "optimized" (e.g., optimized device) based on a quantity of ranks and/or blocks the memory devices (e.g., memory devices 130, 140 in FIG. 1) includes.

The configurations 221-1, 221-2 can describe a quantity of banks that a memory device has per rank. The configurations 221-1, 221-2 can be associated with addresses that the memory sub-system received from a host. For example, utilizing the configuration 221-1, the host can provide an address that includes row bits (e.g., R) 225-1, bank bits (e.g., b) 227-1, and column bits (e.g., C) 228-1. In the configuration 221-1, the memory devices include four banks which can be addressed (e.g., the banks can be selected) utilizing two bank bits 227-1. The row bits 225-1 can be utilized to select a row or multiple rows from the selected bank(s). The column bits 228-1 can be utilized to select a column or multiple columns from the selected bank(s).

The configuration 221-1 illustrates the addresses the controller receives. For instance, the controller of the memory sub-system receives the row bits 225-1, the bank bits 227-1, and the column bits 228-1 for both the one rank mapping 221-1 and the two rank mapping 223-1. If the memory devices have two ranks, although not shown, the addresses received by the memory sub-system can include a rank bit (e.g., r) 224-1. The addresses received at the mapping circuitry configured to implement two rank mapping 223-1 can also include the rank bit 224-1 in addition to row bits, bank bits, and column bits. The two rank mapping 223-1 can be utilized when the memory devices include two ranks of banks. A first memory device can include a first rank and the second memory device can include a second rank. The rank bit 224-1 can be utilized to select between the first rank and the second rank. In examples that include more than two ranks, the memory address can include more than two rank bits.

The one rank mapping 222-1 and the address received from the host can be utilized to select a row, a column, and a bank of a single rank (e.g., rank 0). The two rank mapping 223-1 and the address received from the host can be utilized to select a row, a column, and a bank of a first rank or a second rank. The first rank (e.g., rank 0) and the second rank (e.g., rank 1) are shaded differently, in the example of the configuration 221-1, to identify that the rank bit 224-1 can be utilized to differentiate between the ranks.

The configuration 221-1 allows memory devices having four banks per rank to be utilized with a controller that is configured to manage four banks per rank. The controller can have four state machines if a controller is configured to manage a single rank having four banks or eight state machines if a controller is configured to manage two ranks each having four banks. Each of the state machines can correspond to a different one of the banks. As used herein, a state machine is hardware that defines a number of states of a bank of the memory devices of the memory sub-system.

In a number of examples, the configuration 221-2 for an optimized device can include eight banks per rank even though the controller is configured to manage 4 banks per rank. In other examples, the memory device can include more than eight banks per rank such as 16 banks, 32 banks, 64 banks, etc., and the controller is configured to manage fewer banks than the memory device(s) includes. For instance, if the memory devices includes 64 banks per rank, then the memory device can manage 4 banks, 8 banks, 16, or 32 banks per rank.

The memory sub-system can receive an address that incudes row bits 225-2, bank bits 227-2, and column bits 228-2 when the memory devices include a single rank with eight banks. Three bank bits 227-2 can be utilized to identify any of eight banks. A rank bit (not shown) can also be received with the address if the memory devices include two ranks with eight banks each.

The mapping circuitry can map the address received from the host to an address that includes the row bits 225-3, the rank bit 224-3, the bank bits 227-3, and column bits (not numbered) in a one rank mapping 222-2. The mapping circuitry can create the rank bit 224-3 from the bank bits 227-2. For example, the mapping circuitry can receive the bank bits 227-2 and can partition the bank bits 227-2 to create the bank bits 227-3 and the rank bit 224-3. Although a single rank bit 224-3 is shown as being in a mapped address provided to the controller or a decoder of the controller of the memory sub-system, the mapped address can include multiple rank bits.

The bank bits 227-3 and the rank bit 224-3 can collectively be the bank bits 227-2. For example, the summation (e.g., 1+2=3) of the rank bit (e.g., 1) and the quantity of bank bits 227-3 (e.g., 2) can equal the quantity of the bank bits 227-2 (e.g., 3). The rank bit 224-3 is the most significant bit of the bank bits 227-2. In other examples, the rank bit 224-3 can be mapped to a least significant bit of the bank bits 227-2 or a different bit from the bank bits 227-2.

The order of the bits of the one rank mapping 222-2 and/or the two rank mapping 223-2 is illustrative and not meant to be limiting. For example, the mapped address that includes the row bits 225-3, the rank bit 224-3, the bank bits 227-3, and the column bits can be provided in any order. For example, the rank bit 224-3, although shown with the bank bits 227-3, can be provided prior to the row bits 225-3 similarly to how the rank bit 224-2 is shown as being prior to the row bits 225-4.

The address received from the host can include a rank bit 224-2 if the address received from the host is intended to access banks in multiple ranks. For example, the host can provide an address that includes a rank bit, the row bits 225-2, the bank bits 227-2, and the column bits 228-2. The mapping circuitry can create a row bit (e.g., "R") from the bank bits 227-2. For example, the mapping circuitry can receive the bank bits 227-2 and can partition the bank bits 227-2 to create the bank bits 227-4 and the row bit denoted as "R". Although a single "R" bit is shown as being in the mapped address provided to the controller or a decoder of the controller of the memory sub-system, the mapped address can include multiple row bits generated from the bank bits 227-2.

The bank bits 227-4 and the "R" bit can collectively be the bank bits 227-2. For example, the summation (e.g., 1+2=3) of the "R" bit (e.g., 1) and the quantity of bank bits 227-4 (e.g., 2) can equal the quantity of the bank bits 227-2 (e.g., 3). The "R" bit is the most significant bit of the bank bits 227-2. In other examples, the "R" bit can be mapped to a least significant bit of the bank bits 227-2 or a different bit from the bank bits 227-2. The "R" bit can be added to the row bits 225-2 to generate the updated row bits 225-4.

The controller can receive the mapped addresses that correspond to the one rank mapping 222-2 or the two rank mapping 223-2. For instance, if a memory sub-system that includes the controller also includes a single memory device having a single rank 226-1 with eight banks 229-0, 229-1, 229-2, 229-3, 229-4, 229-5, 229-6, 229-7 (e.g., banks 0, 1, 2, 3, 4, 5, 6, 7), then the controller can utilize the rank bit 224-3 to divide the banks 229-0, 229-1, 229-2, 229-3, 229-4, 229-5, 229-6, 229-7 into banks 229-0, 229-1, 229-2, 229-3 and banks 229-4, 229-5, 229-6, 229-7. A first value of the rank bit 224-3 can be utilized to select the banks 229-0, 229-1, 229-2, 229-3 and a second value of the rank bit 224-3 can be utilized to select the banks 229-4, 229-5, 229-6, 229-7. The bank bits 227-3 can be utilized to select a bank from the selected banks (e.g., the banks 229-0, 229-1, 229-2, 229-3 or the banks 229-4, 229-5, 229-6, 229-7).

For example, rank bit 224-3 having a "0" value can be utilized to select the banks 229-0, 229-1, 229-2, 229-3. The rank bit 224-3 having a "1" value can be utilized to select the banks 229-4, 229-5, 229-6, 229-7. The bank bits 227-3 having a "00" value can be associated with the bank 229-0 and the bank 229-4. The bank bits 227-3 having a "00" value together with the rank bit 224-3 having a 0 value can be utilized to select the bank 229-0. The row bits 225-3 and the column bits can be utilized to access memory cells of the bank 229-0.

Utilizing the rank bit 224-3 generated from the bank bits 227-2 allows the host to provide addresses to a memory device having a single rank 226-1 and eight banks 229-0, 229-1, 229-2, 229-3, 229-4, 229-5, 229-6, 229-7 while retaining the simplicity and cost of a controller that is designed to access four banks. From the controller's perspective, the memory device includes two ranks, each rank having four banks instead of a single ranking having eight banks.

Utilizing the two rank mapping 223-2, the mapped address can be utilized by the controller to treat multiple banks as a single bank for the purposes of accessing the multiple banks. For instance, the ranks 226-2, 226-3 are illustrated twice to differentiate an actual configuration of the banks 229-8, 229-9, 229-10, 229-11, 229-12, 229-13, 229-14, 229-15, 229-16, 229-17, 229-18, 229-19, 229-20, 229-21, 229-22, 229-23, and a perceived (e.g., by the controller) configuration of the banks 229-8, 229-9, 229-10, 229-11, 229-12, 229-13, 229-14, 229-15, 229-16, 229-17, 229-18, 229-19, 229-20, 229-21, 229-22, 229-23.

The banks 229-8, 229-9, 229-10, 229-11, 229-12, 229-13, 229-14, 229-15, 229-16, 229-17, 229-18, 229-19, 229-20, 229-21, 229-22, 229-23 can be divided into the ranks 226-2, 226-3 in a first memory device and a second memory device, respectively. The banks 229-8, 229-9, 229-10, 229-11, 229-

12, 229-13, 229-14, 229-15 are in the rank 226-2 and the banks 229-16, 229-17, 229-18, 229-19, 229-20, 229-21, 229-22, 229-23 are in the rank 226-3. However, the controller may be limited to access four banks per rank. The illusion of four banks per rank can be created by grouping banks. For example, the banks 229-8, 229-9 are grouped into bank 0 for the rank 226-2, the banks 229-16, 229-17 are grouped into bank 0 for the rank 226-3, the banks 229-10, 229-11 are grouped into bank 1 for the rank 226-2, the banks 229-18, 229-19 are grouped into bank 1 for the rank 226-3, the banks 229-12, 229-13 are grouped into bank 2 for the rank 226-2, the banks 229-20, 229-21 are grouped into bank 2 for the rank 226-3, and the banks 229-14, 229-15 are grouped into bank 3 for the rank 226-2, the banks 229-22, 229-23 are grouped into bank 3 for the rank 226-3.

The "R" bit from the row bits 225-4 can be utilized to pick a bank from the pairs (e.g., bank pairs). If the "R" bit has a "0" value than a first bank from the bank pairs can be selected (e.g., 229-8, 229-10, 229-12, 229-14, 229-16, 229-18, 229-20, 229-22). If the "R" bit has a "1" value then a second bank from the bank pairs can be selected (e.g., 229-9, 229-11, 229-13, 229-15, 229-17, 229-19, 229-21, 229-23). The row bits 225-4, including the "R" bit, can be used to differentiate between bank pairs.

FIG. 3 is a flow diagram corresponding to a method 380 for mapping banks in accordance with some embodiments of the present disclosure. The method 441 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 380 is performed by the mapping circuitry 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 381, a rank bit, a plurality of row bits, a plurality of column bits, and a plurality of bank bits can be received at mapping circuitry of a memory sub-system. The rank bit, the plurality of row bits, the plurality of column bits, and the plurality of bank bits can be an address provided by a host. The address can be provided by the host to access a one or more banks of the memory devices of the memory sub-system.

At 382, a row bit can be generated, at the memory circuitry, from a bank bit of the plurality of bank bits. The bank bit can be mapped as a row bit. The bank bit can be relabeled as a row bit. In various instances, the bank bit can be provided to decode circuitry that received bank bits as part of the mapping and/or creating of the row bit.

At 383, updated bank bits can be generated at the mapping circuitry by removing the bank bit from plurality of bank bits. At 384, updated row bits can be generated at the mapping circuitry by adding the row bit to the plurality of row bits. At 385, a first memory device and/or a second memory device can be accessed utilizing a controller of the memory subsystem, the rank bit, the updated row bits, the plurality of column bits, and the updated bank bits. The first memory device and the second memory device can be accessed as part of performing a read operation and/or a write operation. In various instances, the rank bit, the updated row bits, the plurality of column bits, and the updated ban bits can be provided to a decoder of the controller prior to accessing the first memory device and/or the second memory device.

The first memory device includes a quantity of banks that is greater than a first quantity of state machines available to the controller for the first memory device. The state machines of the controller can be associated with banks of the first memory device. Given that there are fewer state machines than there are bank in the first memory device, the banks can be grouped and each grouping of banks can be associated with a state machine of the controller. Associating a group of banks with a state machine includes utilizing the state machine to track a state of the group of banks. The second memory device includes a quantity of banks that is greater than a second quantity of state machines available to the controller for the second memory device. In various instances, the state machines.

The row bit can be added to the updated row bits as a least significant bit or a most significant bit. The updated bank bits can be generated by removing the bank bit which is a most significant bit from the plurality of bank bits.

The row bit can be utilized to access one of a pair of banks. The banks can be grouped into pairs and the row be utilized to select one of the banks of the pair for accessing. In various instances, a plurality of pages of the plurality of pairs of banks of the first memory device can be opened concurrently utilizing the row bit and the rank bit. For example, pages from one of the banks of each of the pairs of banks can be opened concurrently. A plurality of pages of a plurality of pairs of banks of the second memory device can be opened concurrently utilizing the row bit and the rank bit. In various instances, pages of banks of the first memory device and the second memory device may not be opened concurrently. A pair of banks can be selected utilizing the updated bank bits. A pair of banks can be addressed such that the updated bank bits can be utilized to select pair instead of individual banks of the pairs of banks. The mapping circuitry can be internal to the controller, or external to the controller. In various instances, portions of the mapping circuitry can be external to the controller while different portions of the mapping circuitry are internal to the controller.

In various examples, the mapping circuitry can receive a plurality of row bits, a plurality of column bits, and a plurality of bank bits. The mapping circuitry can receive the plurality of row bits, the plurality of column bits, and the plurality of bank bits from a host through pins of the memory sub-system. Specific pins of the memory sub-system can be configured to receive specific ones of the plurality of row bits, the plurality of column bits, and the plurality of bank bits. The mapping circuitry can map the signals received from the pins to lines of the control circuitry. For example, the mapping circuitry can map signals received from pins configured to provide bank bits to lines of the control circuitry configured to receive rank bits.

In various instances, the mapping logic can receive a first memory address comprising a plurality of row bits, a plurality of column bits, and a plurality of bank bits. The mapping logic can also generate a second memory address based on the first memory address, wherein the second memory address is generated by using a bank bit of the plurality of bank bits of the first memory address as a rank bit in the second memory address and using the remaining bank bits of the plurality of bank bits as updated bank bits such that the second memory address comprises the plurality of row bits, the plurality of column bits, the rank bit, and the updated bank bits.

The mapping circuitry can generate a rank bit from a bank bit from the plurality of bank bits. Although, the rank bit is described as being generated, a signal representing a bank bit can be mapped to a line of the controller configured to receive rank bits. The act of routing a signal representing a bank bit to a line configured to receive a rank bit can be considered the generation of the rank bit or a signal representing the rank bit. The mapping circuitry can also generate updated bank bits by removing the bank bit from the plurality of bank bits. The updated bank bits can be the remaining bits from the bank bits after the bank bit is removed. The mapping circuitry can provide the plurality of row bits, the plurality of column bits, the rank bit, and the updated bank bits to the controller to access a plurality of banks of the memory device. The controller can utilize the row bits, the column bits, the rank bits, and the updated bank bits to perform an access command such as a write command and/or a read command. The controller can write to an address that includes the row bits, the column bits, the rank bits, and the updated bank bits.

The quantity of the plurality of banks of the memory device can be greater than the quantity of state machines of the controller. The rank bit can be generated to access bank from the plurality of banks of the memory device using the rank bit and the updated bank bits. In various instances, the rank bit can be utilized to differentiate between two banks that are identified using the updated bank bits. The updated bank bits can be utilized to identify two banks. The two banks can have a same address that includes the updated bank bits. The rank bit can differentiate between the two banks.

In various instances, the rank-to-rank delay can be set to zero responsive to receipt of the rank bit. Traditionally, a rank-to-rank delay would be set to a non-zero value in architectures which utilize multiple ranks. In a number of examples, a rank bit can be utilized while setting the rank-to-rank delay to zero given that the memory devices online include a single rank. The rank bit is utilized to allow the controller to function as if there are multiple ranks without encoring the costs of a rank-to-rank delay.

In a number of examples, a rank bit, a plurality of row bits, a plurality of column bits, and a plurality of bank bits can be received at mapping circuitry of a memory sub-system. The mapping circuitry can generate, a row bit from a bank bit from the plurality of bank bits and generate updated bank bits by removing the bank bit from the plurality of bank bits. The mapping circuitry can generate updated row bits by adding the row bit to the plurality of row bits. A controller of the memory sub-system can access a first memory device and a second memory device of the memory sub-system utilizing the rank bit, the updated row bits, the plurality of column bits, and the updated bank bits. Each of a plurality of state machines of the controller corresponds to a different pair of a first plurality of banks of the first memory device and a second plurality of banks of the second memory device. A quantity of the first plurality of banks of the first memory device and a quantity of the plurality of banks of the second memory device is greater than a quantity of banks supported by the controller. For example, the quantity of the first plurality of bank is greater than the quantity of state machine of the controller. The quantity of the second plurality of banks is also greater than the quantity of state machines of the controller. The plurality of state machined of the controller can define the quantity of banks supported by the controller.

The mapping circuitry can multiplex the bank bit to the updated row bits. Registers (e.g., registers 114 of FIG. 1) of the controller can be utilized to control a multiple operation performed by the mapping circuitry to multiplex the bank bit to the updated row bits. In various instances, the register of the controller can be utilized to activate the mapping circuitry and/or to map bank bits to the updated row bits. For example, the mapping circuitry may not map bank bits to the updated row bits if the register stores a first value and may map bank bits to the updated row bits if the register stores a second value. In various instances, the registers of the controller can be utilized to cause the mapping circuitry to utilize a one rank mapping, a two rank mapping, or not mapping.

In various instances, a memory device can include a plurality of banks. A controller coupled to the memory device can support up to a particular quantity of banks that is smaller than the plurality of banks. The controller can access a first bank of the plurality of banks responsive to receipt of an address without a rank bit and can access a second bank of the plurality of banks responsive to receipt of the address having the rank bit. The controller can access the first bank utilizing a first updated address that maps a bank bit of the address to the rank bit. The controller can access the second bank utilizing a second updated address that maps a bank bit of the address to a row bit. The quantity of the banks of the memory device can be greater than the particular quantity of banks supported by the controller. The controller can resolve addresses to a quantity of banks that is greater than it can support by mapping bits of the addresses to the banks to bits of the second updated address. For example, the controller can multiplex the bank bit (e.g., of the address) to the row bit (e.g., of the second updated address) to access the second bank. In various instances, the controller can map addresses based on a selected mode. For example, if a first mode is selected, then the controller can map received addresses consistent with a 1 rank mapping. If a second mode is selected, then the controller can map addresses consistent with a 2 rank mapping (e.g., 2+ rank mapping).

Figure 4:
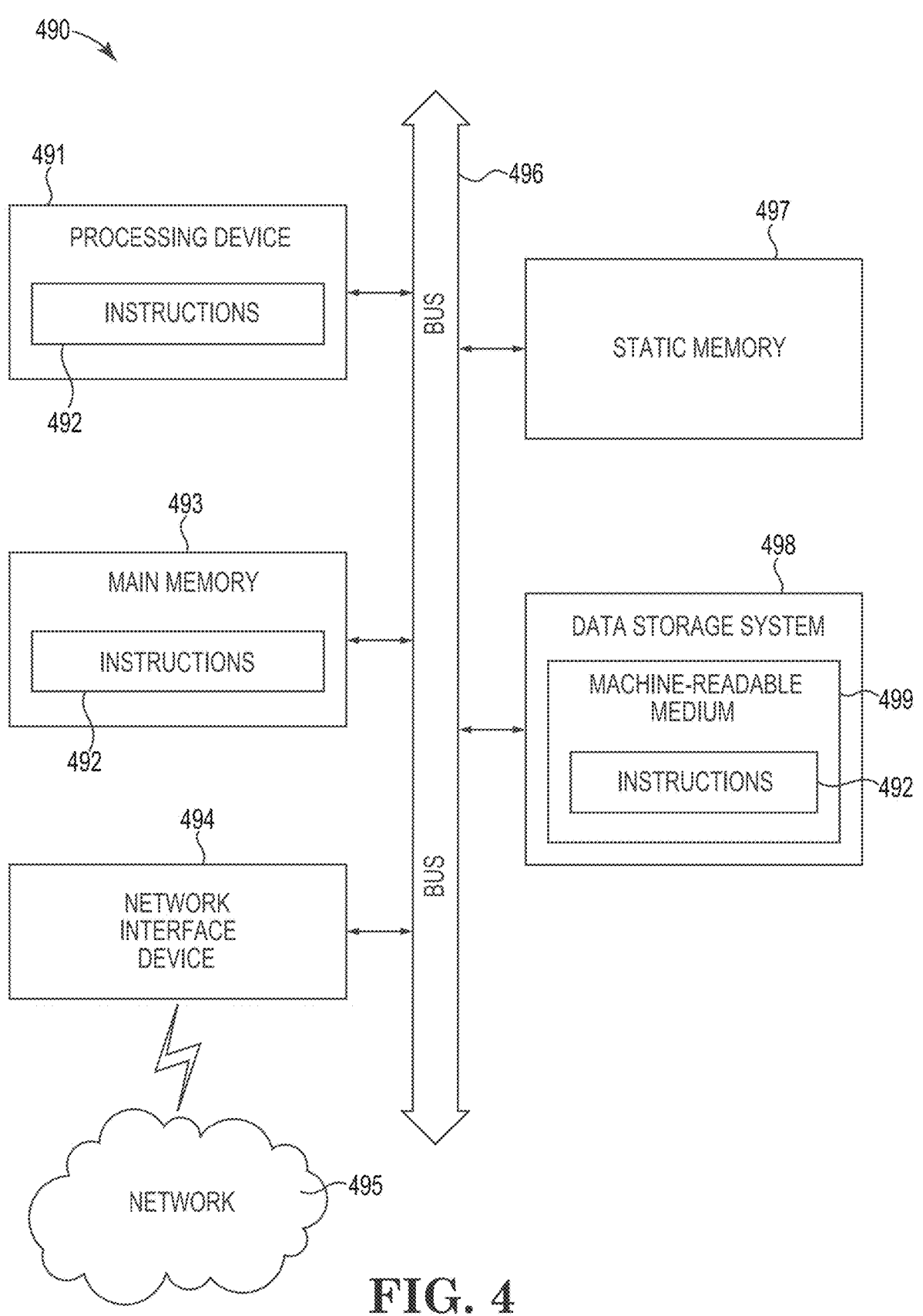
FIG. 4 is a block diagram of an example computer system in which embodiments of the present disclosure may operate.

FIG. 4 is a block diagram of an example computer system 490 in which embodiments of the present disclosure may operate. For example, FIG. 4 illustrates an example machine of a computer system 490 within which a set of instructions, for causing the machine to perform any one or more of the methodologies discussed herein, can be executed. In some embodiments, the computer system 490 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the mapping circuitry 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 490 includes a processing device 491, a main memory 493 (e.g., read-only memory (ROM), flash memory, dynamic random access memory (DRAM) such as synchronous DRAM (SDRAM) or Rambus DRAM (RDRAM), etc.), a static memory 497 (e.g., flash memory, static random access memory (SRAM), etc.), and a data storage system 498, which communicate with each other via a bus 496.

The processing device 491 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 491 can also be one or more special-purpose processing devices such as an application specific integrated circuit (ASIC), a field programmable gate array (FPGA), a digital signal processor (DSP), network processor, or the like. The processing device 491 is configured to execute instructions 492 for performing the operations and steps discussed herein. The computer system 490 can further include a network interface device 494 to communicate over the network 495.

The data storage system 498 can include a machine-readable storage medium 499 (also known as a computer-readable medium) on which is stored one or more sets of instructions 492 or software embodying any one or more of the methodologies or functions described herein. The instructions 492 can also reside, completely or at least partially, within the main memory 493 and/or within the processing device 491 during execution thereof by the computer system 490, the main memory 493 and the processing device 491 also constituting machine-readable storage media. The machine-readable storage medium 499, data storage system 498, and/or main memory 493 can correspond to the memory sub-system 110 of FIG. 1.

In one embodiment, the instructions 492 include instructions to implement functionality corresponding to mapping circuitry (e.g., the mapping circuitry 113 of FIG. 1). While the machine-readable storage medium 499 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
memory device;
a controller coupled to the memory device, wherein the controller is configured to support up to a particular quantity of banks, and wherein the memory device comprises a quantity of banks that is greater than the particular quantity of banks;
mapping logic coupled to the controller and configured to:
receive a first memory address comprising a plurality of row bits, a plurality of column bits, and a plurality of bank bits; and
genera a second memory address based on the first memory address, wherein the second memory address is generated by:
using a bank bit of the plurality of bank bits of the first memory address as a rank bit in the second memory address, and
using the remaining bank bits of the plurality of bank bits as updated bank bits such that the second memory address comprises the plurality of row bits, the plurality of column bits, the rank bit, and the updated bank bits, wherein the remaining bank bits are generated by removing the bank bit from the plurality of bank bits.

2. The apparatus of claim 1, wherein the controller comprises a quantity of state machines that corresponds to the particular quantity of banks.

3. The apparatus of claim 1, wherein the mapping logic is configured to use the bank bit as the rank bit to access a bank from a plurality of banks of the memory device using the rank bit and the updated bank bits.

4. The apparatus of claim 3, wherein the mapping logic is configured to generate the updated bank bits as a bank address that corresponds to two banks from the plurality of banks.

5. The apparatus of claim 4, wherein the two banks are differentiated utilizing the rank bit.

6. The apparatus of claim 1, wherein the controller is configured to set the rank-to-rank delay to zero responsive to receipt of the rank bit.

7. The apparatus of claim 1, wherein the mapping logic is configured to generate the rank bit even though the memory device has a single rank of a plurality of banks of the memory device.

8. A method, comprising:
receiving, at mapping logic of a memory sub-system, a rank bit, a plurality of row bits, a plurality of column bits, and a plurality of bank bits;
generating, at the mapping logic, a row bit from a bank bit of the plurality of bank bits;
generating, at the mapping logic, updated bank bits by removing the bank bit from the plurality of bank bits, wherein the updated bank bits are generated by removing the bank bit from the plurality of bank bits;
generating, at the mapping logic, updated row bits by adding the row bit to the plurality of row bits; and
accessing, utilizing a controller of the memory sub-system, a first memory device and a second memory device of the memory sub-system utilizing the rank bit, the updated row bits, the plurality of column bits, and the updated bank bits,
wherein the controller is configured to support up to a particular quantity of banks, and wherein first memory device and the second memory device comprises a quantity of banks that is greater than the particular quantity of banks.

9. The method of claim 8, wherein the first memory device comprises the quantity of banks that is greater than a first quantity of state machines available to the controller for the first memory device.

10. The method of claim 9, wherein the second memory device comprises the quantity of banks that is greater than a second quantity of state machines available to the controller for the second memory device.

11. The method of claim 8, further comprising generating the updated row bits having the row bit as a least significant bit.

12. The method of claim 8, further comprising generating the updated bank bits by removing the bank bit which is a most significant bit from the plurality of bank bits.

13. The method of claim 8, further comprising accessing one of a pair of banks based on the row bit.

14. The method of claim 8, further comprising opening a plurality of pages of a plurality of pairs of banks of the first memory device concurrently utilizing the row bit and the rank bit.

15. The method of claim 8, further comprising opening a plurality of pages of a plurality of pairs of banks of the second memory device concurrently utilizing the row bit and the rank bit.

16. The method of claim 8, further comprising selecting a pair of banks utilizing the updated bank bits.

17. The method of claim 8, wherein the mapping logic is internal to the controller.

18. An apparatus, comprising:

a memory device comprising a plurality of banks; and a controller configured to support up to a particular quantity of banks that is less than the plurality of banks, wherein the controller is configured to access a first bank of the plurality of banks responsive to receipt of an address without a rank bit and to access a second bank of the plurality of banks responsive to receipt of the address having the rank bit, wherein the controller is further configured to access the first bank utilizing a first updated address that maps a bank bit of the address to the rank bit, wherein updated bank bits that are generated by removing the bank bit from a plurality of bank bits of a first address; and wherein the controller is further configured to access the second bank utilizing a second updated address that maps a bank bit of the address to a row bit.

19. The machine-readable medium of claim 18, wherein the memory device comprises a plurality of banks that is greater than the particular quantity of banks supported by the controller.

\*    \*    \*    \*    \*